United States Patent
Azam et al.

(10) Patent No.: US 6,614,940 B2
(45) Date of Patent: Sep. 2, 2003

(54) SYSTEM, METHOD AND COMPUTER PROGRAM PRODUCT FOR GENERIC OUTLINE FONT COMPRESSION

(75) Inventors: Syed Aamer Azam, Union City, CA (US); Matthias W. Reinsch, Oakland, CA (US)

(73) Assignee: Morisawa & Co., Ltd., Osaka (JP)

( * ) Notice: Subject to any disclaimer, the term of this patent is extended or adjusted under 35 U.S.C. 154(b) by 44 days.

(21) Appl. No.: 09/802,477

(22) Filed: Mar. 9, 2001

(65) Prior Publication Data

US 2002/0141651 A1 Oct. 3, 2002

(51) Int. Cl.[7] .............................. G06K 9/36; G06K 9/46
(52) U.S. Cl. ...................... 382/242; 345/442; 345/469; 345/469.1; 345/947; 382/199; 382/243
(58) Field of Search ................................. 382/197, 199, 382/232, 242, 243; 345/441, 442, 467, 468, 469, 469.1, 947

(56) References Cited

U.S. PATENT DOCUMENTS

| | | | |
|---|---|---|---|
| 4,907,282 A | | 3/1990 | Daly et al. ................... 382/9 |
| 4,949,281 A | * | 8/1990 | Hillenbrand et al. ........ 345/442 |
| 5,131,058 A | | 7/1992 | Ting et al. .................... 382/47 |
| 5,363,107 A | * | 11/1994 | Gertz et al. ................... 342/26 |
| 5,408,598 A | * | 4/1995 | Pryor, Jr. ..................... 345/442 |
| 5,452,371 A | * | 9/1995 | Bozinovic et al. .......... 345/676 |
| 5,623,555 A | | 4/1997 | Nelson et al. .............. 382/233 |
| 5,774,639 A | * | 6/1998 | Schildkraut et al. ....... 358/1.16 |

* cited by examiner

Primary Examiner—Timothy M. Johnson
(74) Attorney, Agent, or Firm—Silicon Valley IP Group; Kevin J. Zilka

(57) ABSTRACT

A system, method and computer program product are provided for compression of characters. Upon receipt of a plurality of characters, at least one test is performed on the characters to determine if an outline of the characters is capable of being approximated by a mathematical approximation. If the outline of the characters is capable of being approximated, the characters are approximated using the mathematical approximation.

9 Claims, 5 Drawing Sheets

SYSTEM, METHOD AND COMPUTER PROGRAM PRODUCT FOR GENERIC OUTLINE FONT COMPRESSION

FIELD OF THE INVENTION

The present invention relates to compression algorithms, and more particularly to compressing textual data for storage and/or transmission utilizing a network.

BACKGROUND OF THE INVENTION

It is well known that an amount of dot data which is obtained by dividing image data of a character or the like into dots is extremely large. Therefore, in order to compress such a large quantity of data and then store or transmit the compressed data, various kinds of data compressing methods have been proposed. For example, the shape of a character or the like may be detected as a contour and contour information may be stored, thereby compressing the data amount.

For example, there are known: a straight line approximating method disclosed in Japanese Patent Laid-Open Applications Nos. 149522/1979 and 79154/1980; an n-degree curve approximating method disclosed in Japanese Patent Laid-open Nos. 39963/1982, 134745/1983, and 75976/1985; and the like.

Another approach is to convert the originally-scanned quantized data into a connected set of mathematically-defined boundaries of two-dimensional regions representing the "inside" or "outside" of a character. The boundaries are comprised of "curve elements" which, in the most primitive implementations, are simple line segments.

More sophisticated systems use more complex shapes such as quadratic or cubic Bezier curves. All of these systems have the objective of storage of these mathematical shapes, and reconstruction of the digital representations of the characters through properly constructed physical mechanisms or computer instructions.

A major benefit to the mathematical description is the ability to render output characters at any size by scaling the coordinate information stored in the character data descriptions, thereby eliminating the need for storage of bitmap data at every desired point size and/or output resolution. An added benefit of a mathematical description is the ability to subdivide the original outline into as many "curve elements" as necessary and to store the data representing them at whatever precision is required for replication of an original "master" design to the degree permitted by the scanning resolution.

In summary, according to the former straight line approximating method, smoothness of the contour is not assured. On the other hand, according to the latter n-degree curve approximating method, although smoothness of a curve is ensured, it is complicated to convert the functional equations to the curve, so that it takes a long time to generate the curve. Therefore, this method has the drawback that it cannot be practically used in a high-speed display device such as CRT or laser beam printer in terms of the processing speed. While attempts at using a Bezier cubic curve have been used to overcome this drawback, such method of forming an approximation is difficult.

There is therefore a need for improved techniques for compressing bitmap fonts using mathematical approximations.

DISCLOSURE OF THE INVENTION

A system, method and computer program product are provided for compression of characters. Upon receipt of a plurality of characters, at least one test is performed on the characters to determine if an outline of the characters is capable of being approximated by a mathematical approximation. If the outline of the characters is capable of being approximated, the characters are approximated using the mathematical approximation.

In one embodiment of the present invention, a search may be conducted for curved splines associated with the characters. Thereafter, the test may be performed on the uncovered curved splines. More particularly, the searching may be conducted for curved splines that connect smoothly.

In another embodiment of the present invention, one of the curved splines may be removed if the outline of the characters is not capable of being approximated. As such, the at least one test may be performed again to determine if the on outline of the characters is now capable of being approximated.

In one aspect of the present invention, the mathematical approximation may be selected from the group consisting of cubic splines, elliptical arcs, and hyperbolic arcs. In an embodiment where the mathematical approximation includes an elliptical arc, such elliptical arc may be approximated by position information and rotational information relating to the rotational orientation of the elliptical arc.

In the present embodiment where the mathematical approximation includes an elliptical arc, the rotational information may include a plurality of points on the elliptical arc, three or more dimensionless parameters, and a bit of information. Such three or more dimensionless parameters may be determined by defining a center of a circle associated with the elliptical arc, applying a first linear transformation to stretch the circle, and applying a second linear transformation that includes a shear parameter.

As an option, constraints may be imposed on the three or more dimensionless parameters to expedite the generation thereof. Further, the constraints may include a rule that the elliptical arc has a same maximum lateral extent from a line defined by a pair of on-curve points on the character.

In still another embodiment of the present invention, the mathematical approximation may include a cubic spline approximated by a plurality of control points that are determined by an equation including two variables. Such control points may be determined by the two-variable equation by imposing constraints on slopes associated with lines on which the control points reside. As an option, constraints may be imposed on the manner in which the mathematical approximations are joined together.

In still yet another embodiment of the present invention, a compressed file may be generated utilizing the mathematical approximation. Optionally, such process may be tunable. Further, a number of bits used to store position coordinates and curve approximation parameters may be approximated. Also, the step of creating the compressed file may involve XY sequences.

DESCRIPTION OF THE PREFERRED EMBODIMENTS

Figure 1:
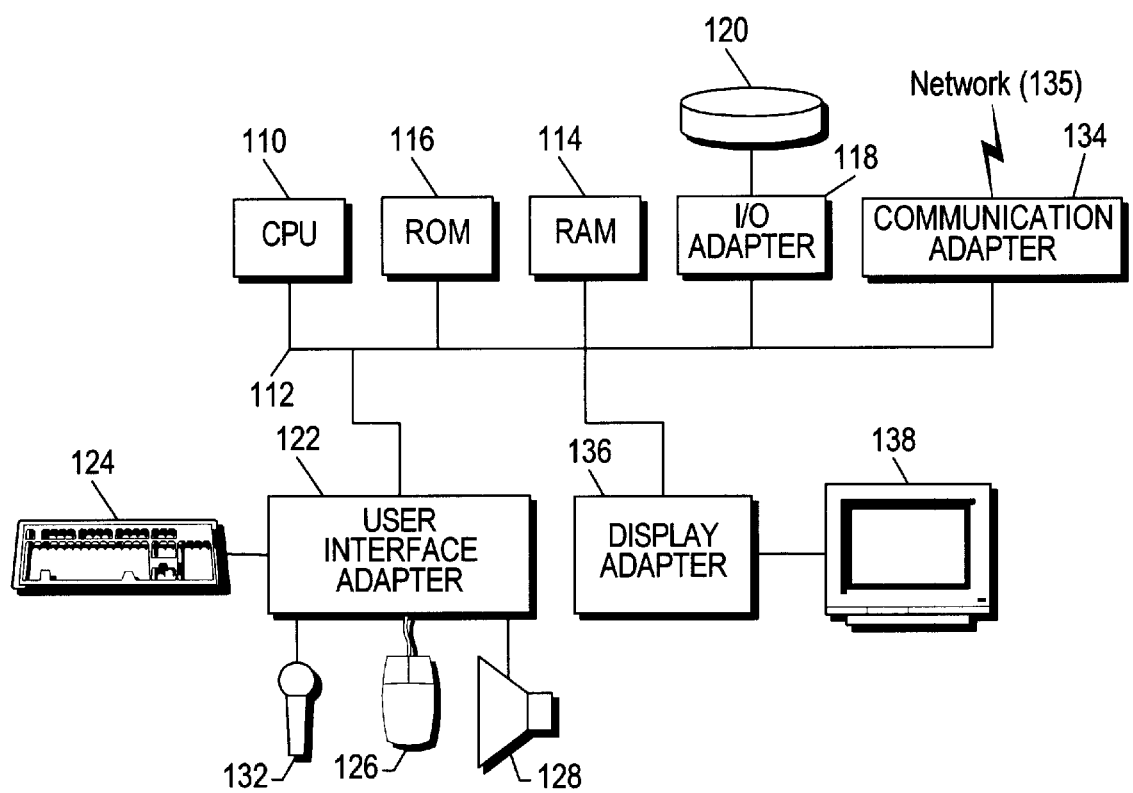
FIG. 1 shows a representative hardware environment in which the present invention may be carried out.

FIG. 1 shows a representative hardware environment in which the various methods of the present invention may be carried out. Such figure illustrates a typical hardware configuration of a workstation in accordance with a preferred embodiment having a central processing unit 110, such as a microprocessor, and a number of other units interconnected via a system bus 112.

The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++language, or other programming languages, along with an object oriented programming methodology. Object oriented programming (OOP) has become increasingly used to develop complex applications.

Figure 2:
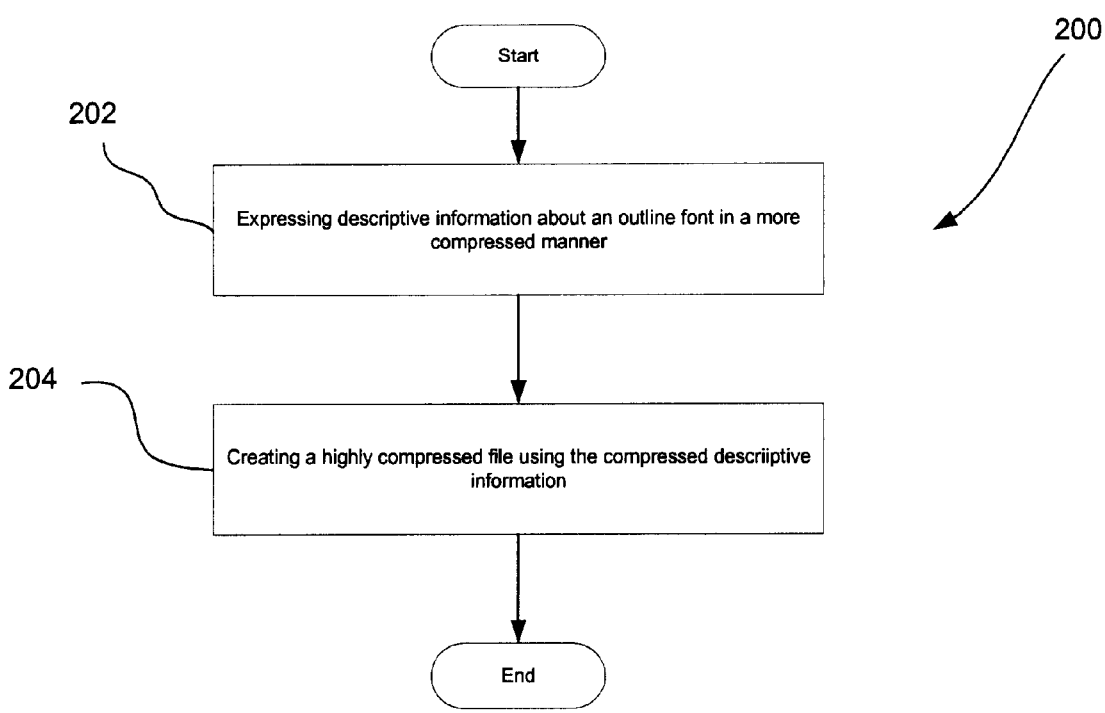
FIG. 2 is flowchart illustrating a two-stage method for compressing characters.

FIG. 2 is flowchart illustrating a two-stage method 200 for compressing characters. A first stage 202 includes a process of taking information about an outline font and expressing this information in a more compact and efficient manner. This is accomplished using mathematical primitives. The compression may be lossy. In other words, the outline defined by the compressed description may be slightly different than the original outline. As an option, this difference is a tunable parameter is the process. One can select a better approximation, with the result that the compression ratio is reduced. Alternatively, the degree to which the compressed outline approximates the original outline can be reduced, and as a result the compression is improved (the size of the compressed data file will be reduced).

Figure 3:
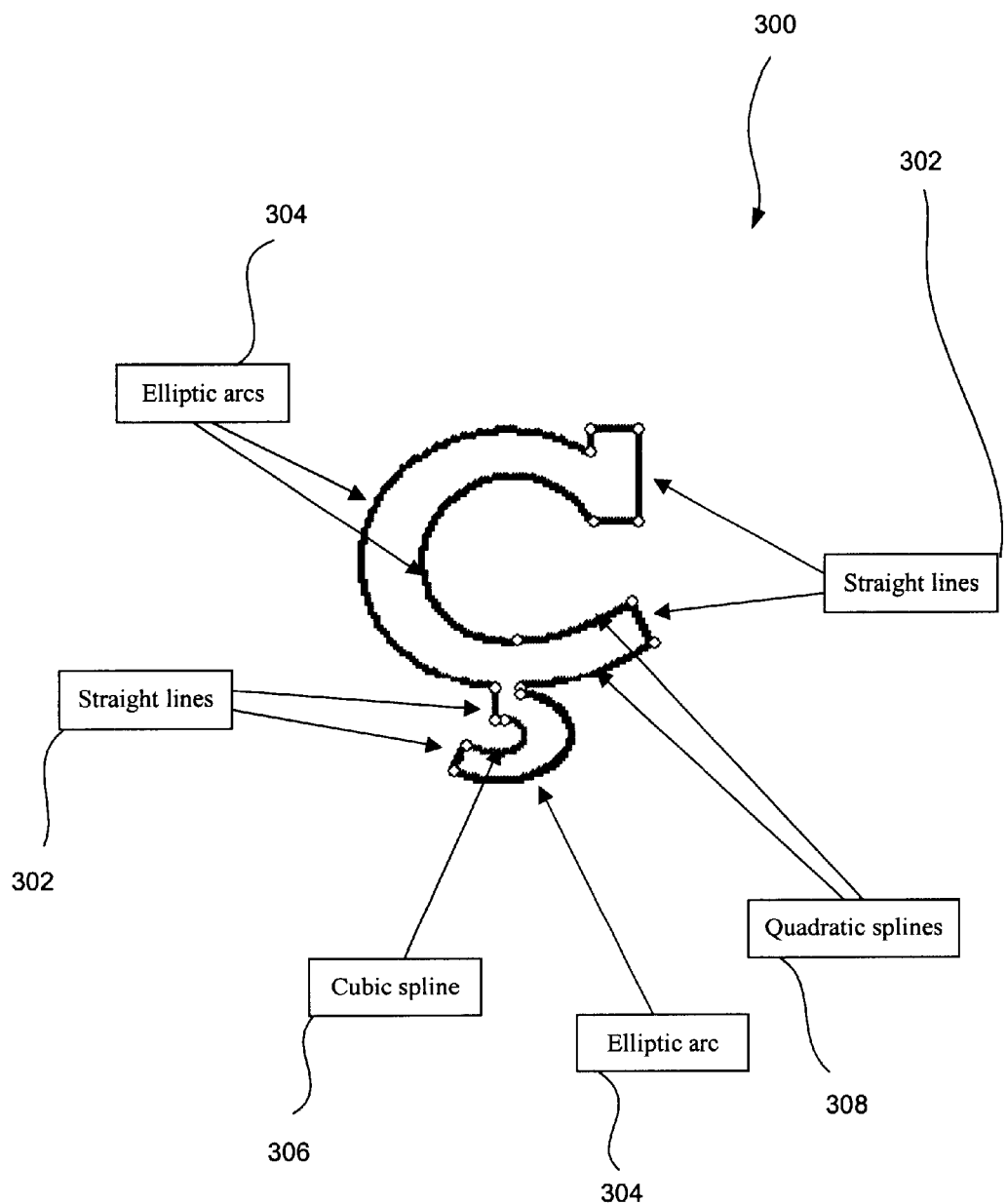
FIG. 3 illustrates an example of an outline that may be described as a sequence of mathematical primitives.

FIG. 3 illustrates an example of an outline 300 that may be described as a sequence of mathematical primitives. As shown, such an outline 300 may be described to include straight lines 302, elliptical arcs 304, cubic splines 306, quadratic splines 308, etc.

With continuing reference to FIG. 2, a second stage 204 of the method 200 of compression includes a process of taking the compressed mathematical description of the glyphs mentioned above and creating a highly compressed binary file according to certain procedures.

Figure 4:
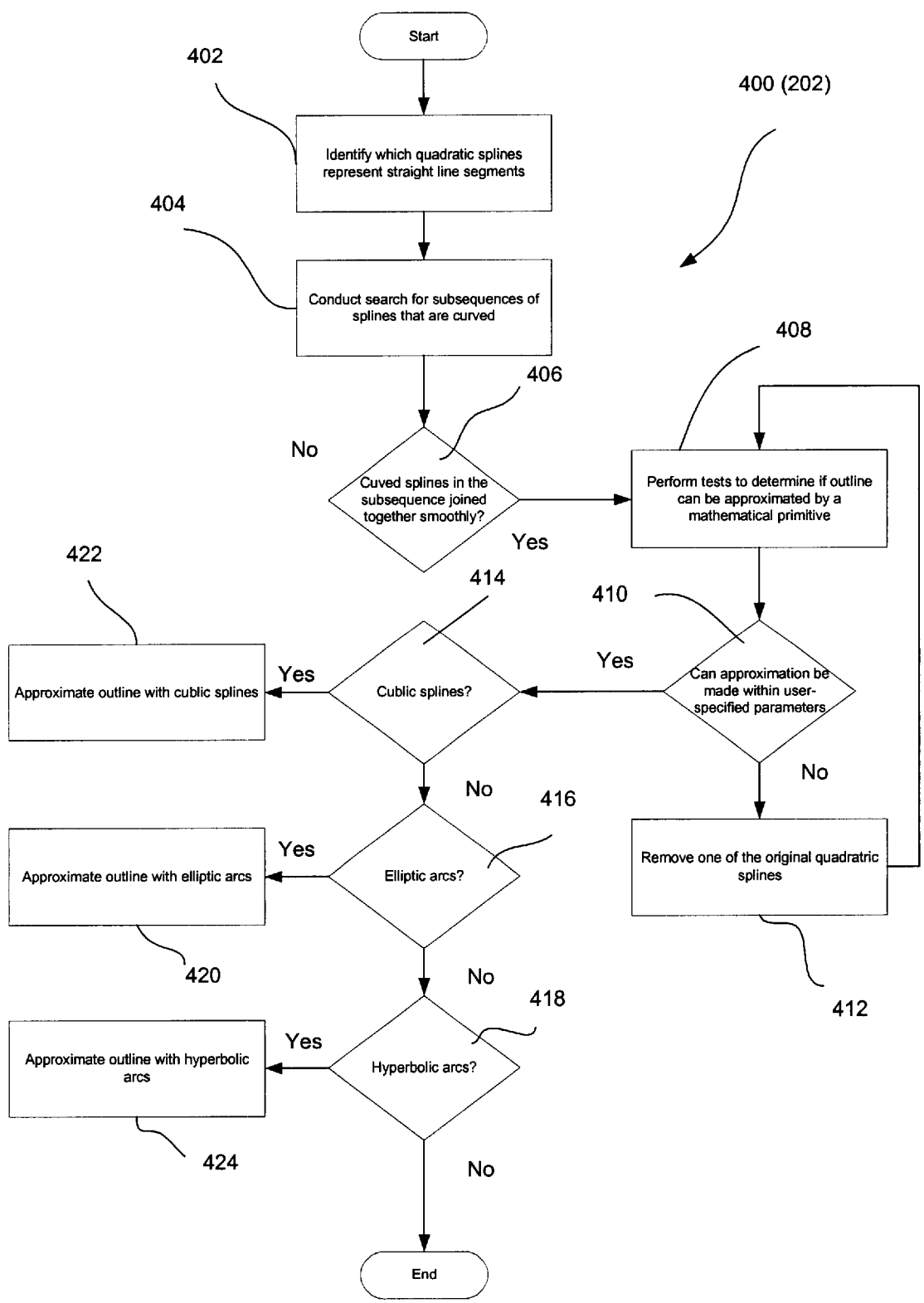
FIG. 4 illustrates a more detailed description of the first stage of the method of FIG. 2.

FIG. 4 illustrates a more detailed description 400 of the first stage 202 of the method 200 of FIG. 2. Before the process begins, outline data about a set of glyphs is collected. This could be TrueType or other types of data. Such outline data may also include a set of points drawn around the outline of a glyph. For the purposes of the present discussion, TrueType data will be assumed to be used, i.e. a sequence of quadratic splines that defines the outlines of the glyphs.

Initially, in operation 402, the quadratic splines that represent straight-line segments are first identified. This can be accomplished using a test involving a vector cross product by carrying out two multiplications and five subtractions. The idea is to reduce the problem to that of computing a vector cross product of two vectors in a two-dimensional space. Thus, it is first necessary to calculate the two components of each of the two vectors involved. This is accomplished by subtracting the initial point from the final point. Therefore, a total of four subtractions are involved in determining the components of the two vectors. Next, the cross product is calculated using two multiplications and a further subtraction. This is the natural extension of the idea of a cross product to a two-dimensional space. The cross product is ordinarily used to combine two vectors in a three-dimensional space to obtain another vector in the three-dimensional space. In the present context, two vectors in a two-dimensional space are combined to obtain a single number. Such a number represents the signed area of the parallelogram defined by the two vectors. Thus, this number can be used to test if the two vectors are parallel or not. If they are parallel, the resulting area will be zero. If the area is not zero, the vectors are not parallel, and the spline is not a straight line. As will become apparent later, straight-line segments are handled separately with respect to the remaining segments.

Next, in operation 404, a search is carried out for subsequences of splines that are all curved. Such search is conducted for the set of splines that constitute a given closed curve.

It should be noted that subsequences of maximal length are identified first. For each subsequence, a test is carried out to determine if the splines in the subsequence join together smoothly. Note decision 406. In other words, it is determined whether that the tangent vectors of two splines are parallel at the point where they join together.

Having identified such a smooth subsequence of curves, various tests are carried out in operation 408. Such tests are performed to determine if the present part of the outline can be approximated well by a mathematical primitive. Note decision 410.

Table 1 illustrates the various mathematical primitives that may be employed.

TABLE 1 cubic splines (414)
elliptic arcs (416)
hyperbolic arcs (418)

If the fit of any of these curves is acceptable according to a cut-off parameter that can be adjusted by the user (tunable), such part of the outline is stored as this mathematical curve in the manner that will soon become apparent. If none of the mathematical curves fits well enough, one of the original quadratic splines is removed from the subsequence in operation 412, and the procedure is repeated with the remaining set of splines.

Some of the details of how the mathematical curves in Table 1 may be implemented will now be set forth.

Elliptical Arc (420)

In general, an elliptic arc is specified by seven numbers. These may be thought of as two coordinates for one endpoint, two coordinates for the other endpoint, and three parameters that determine the shape of the arc. One possible formulation for these three parameters will now be set forth.

The present choice of parameters involves dimensionless numbers that do not depend on the overall size of the glyph. First, the center of a circle is defined by specifying its location along the perpendicular bisector of the two on-curve points mentioned above (the endpoints). This distance along the perpendicular bisector is specified in units of the distance between the two points, so the specification involves a dimensionless parameter. This parameter can be positive, negative or zero.

At this point, a circular arc is defined by requiring it to pass through the two on-curve points and also have the specified center. Next, a linear transformation is applied that causes a stretching in the direction perpendicular to the line connecting the two on-curve points. Again, a dimensionless parameter is involved in the definition of this transformation.

Thereafter, a linear transformation is applied that is a shear along the direction defined by the two on-curve points. This involves a third dimensionless parameter.

Finally, one bit of information (a zero or a one) is included to specify the side of the original line segment (the line segment connecting the two on-curve points) on which the elliptic arc lays. The reason that this bit is necessary is that the points along the outline are in a sequence. As such, the possibility of introducing a convention that the arcs lie always on the left side of the ray starting at the first on-curve point and having a direction defined by the second on-curve point is not possible. Such a convention would be possible if, for example, a free-floating elliptic arc were being defined. Then, the order in which the two on-curve points were presented could be used as part of a convention for determining the side on which the elliptic arc were located.

In summary, the overall position and rotational orientation of the arc is determined by the two on-curve points, and the exact type of elliptical arc is determined by the three dimensionless parameters and the single additional bit of information.

The process of fitting an elliptic arc to a set of data points involves minimizing a real-valued function of three variables. These variables may be the three dimensionless parameters mentioned above. Minimizing a function of three variables requires a considerable amount of CPU time, so it is desirable to reduce the problem to that of minimizing a function of two variables.

This may be accomplished by imposing a constraint on the three parameters. One constraint is that the family of ellipses under consideration has the same maximum lateral extent from the line between the two on-curve points as the original font data. With this constraint imposed, the problem reduces to that of minimizing a function of two variables.

This is carried out using a variety of different starting points for the minimizing algorithm, and the results are compared with certain limits on the parameters. It is desirable to avoid elliptic arcs that display extreme behavior or whose curvature is too severe at the turning points. The limits may be set by the user in advance. If the elliptic arc does not satisfy the conditions imposed by these limits, it is rejected. Subsequently, the other mathematical primitives become the remaining candidates.

It should be noted that the data that is used to describe an elliptic arc can be expressed in different equivalent forms. The form described above involves the specification of four coordinates to determine the two on-curve points, while the exact type of elliptical arc is determined by the three dimensionless parameters and the single additional bit of information.

One alternative may include thinking of the additional bit as a sign bit for the first linear transformation parameter, thus combining these into a single signed parameter. The reason it is useful to keep these separate, however, involves the manner in which the process optimizes the elliptical fit. The sign bit is determined early in the procedure, and then the minimization process involves a stretching parameter that is always positive. In contrast, the second linear transformation (also discussed above) involves a shear parameter that is treated as a signed quantity throughout the process.

Cubic Spline (422)

The process of fitting a cubic spline to a set of data points may, in principle, involve minimizing a function of four variables, the position coordinates of the two control points. In practice, this requires a great deal of CPU time, so the following alternative method has been developed.

The location of the two control points may be reduced to a two-dimensional problem by requiring that the points lie on lines determined by certain conditions on their slopes. These conditions may dictate that the direction of the line from the first endpoint to the first control point be the same as the direction of the line from the first endpoint to the control point of the first spline in the subsequence of splines that is being considered. A similar constraint may be imposed on the other control point relative to the last endpoint.

The two degrees of freedom remaining are the location of the control points along the lines just defined. Having reduced the problem to that involving the minimization of a real-valued function of two variables, the process becomes fairly rapid and can be carried out by a simple method of locating global minima.

Depending on the font under consideration, it may be advantageous to rule out the use of one of the mathematical primitives. For example, it has proven to be useful to eliminate the hyperbola from consideration when compressing certain Latin and ideographic fonts. This reduction in the number of primitives makes it possible to reduce the amount of overhead in the compressed data file, and furthermore it makes for a more compact rasterizer because the rasterizer does not have to support the rendering of the additional primitive.

Hyperbolic Arcs (424)

It should be noted that approximation by hyperbolic arcs may be accomplished utilizing any desired manner. For example, a method that accomplishes the task is to begin with a symmetric hyperbola that passes through the two endpoints that are given. The vertical extent is determined by the maximum vertical extent of the data points, as in the case of the ellipse. The only remaining parameter at this stage is a parameter that is analogous to the radius of a circle, when carrying out the corresponding process for an elliptic arc. This parameter is a measure for how sharp the hyperbola is at the upper point (the point with the same lateral extent as the data set). Next, a linear transformation that effects a stretch in the vertical direction is implemented. This involves an additional parameter, which may be taken to be positive Finally, a linear transformation that effects a shearing is applied. In total, three parameters are involved. The idea of matching the lateral extent of the data points can be used to reduce this to two parameters, which results in a faster search for the optimum parameters.

Alternatives

Other techniques for optimizing the compression will now be set forth. To improve the appearance of the glyphs generated from the compressed data, it is often useful to impose certain constraints on the way in which the mathematical primitives join together. Some of these constraints involve how ellipses join with other types of primitives.

For example, it may be desirable to forbid elliptic arcs to join with straight-line segments if their directions are similar but not exactly the same. Such a situation could occur near the top of a capital B, for example. Another constraint that could be imposed includes a condition on the direction of an elliptical arc and a cubic spline at the point where they join together, if their directions are similar at that point.

Figure 5:
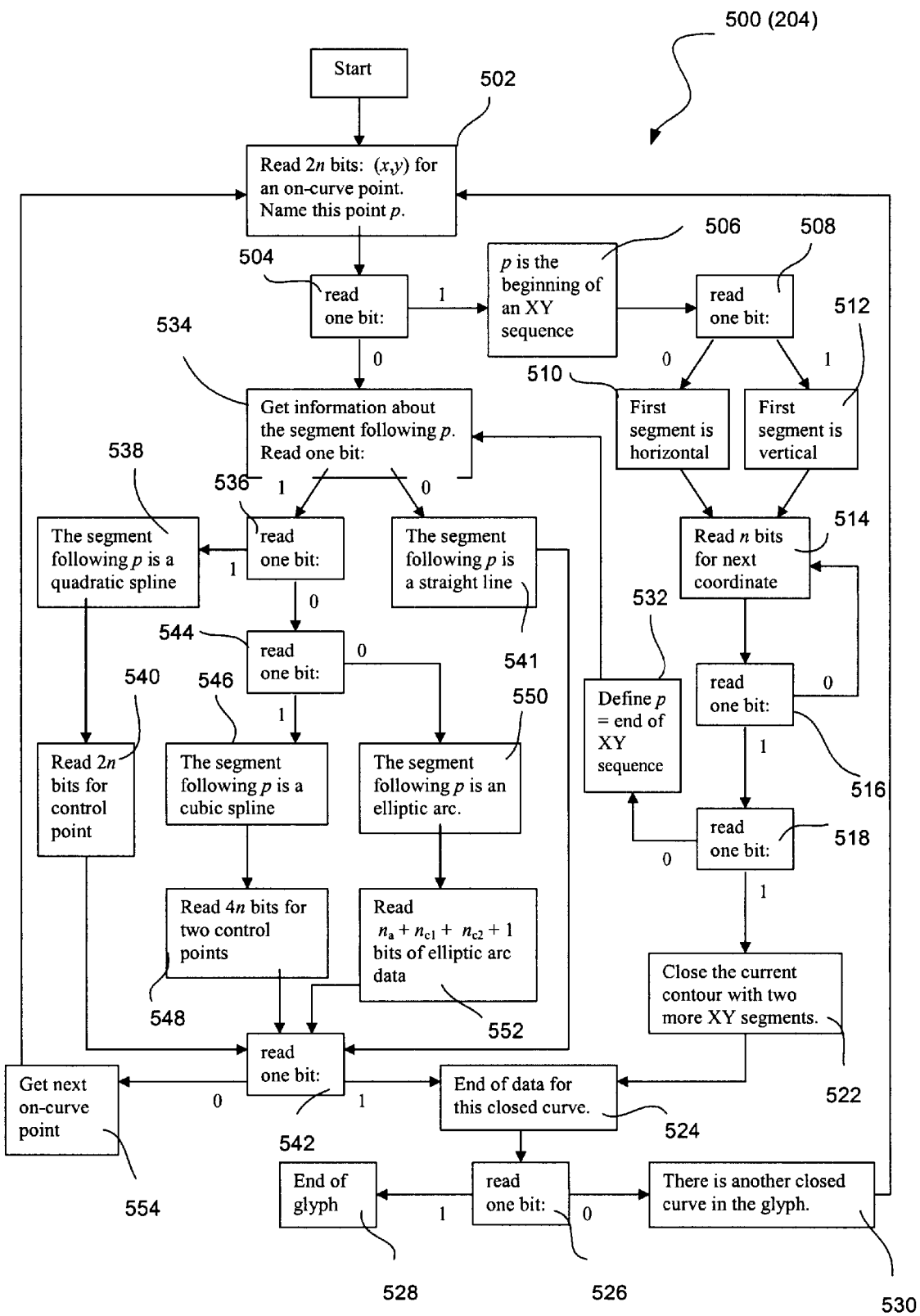
FIG. 5 is a flowchart illustrating the manner in which the second stage of the method of FIG. 2 operates, in accordance with one embodiment of the present invention.

FIG. 5 is a flowchart illustrating the manner 500 in which the second stage 204 of the method 200 of FIG. 2 operates, in accordance with one embodiment of the present invention. The second stage of the compression method 200 is the process of taking the compressed mathematical description of the glyphs described above and creating a highly compressed binary file. This process involves several tunable parameters.

Such tunable parameters may include the number of bits that are used to store position coordinates (see n in FIG. 5) and the number of bits that are used to store the ellipse parameters (see $n_a$, $n_{c1}$ and $n_{c2}$ in FIG. 2).

Another important concept includes that of an XY sequence. An XY sequence is a sequence of straight-line segments in an outline, with the property that they have alternately horizontal and vertical components. An example of an XY sequence is visible in the upper right portion of the character of FIG. 3.

A great savings in space can be accomplished by identifying such XY sequences because only one position coordinate must be specified per segment. Thus, even a single horizontal or vertical segment may be treated in this way because it saves the specification of a position coordinate.

Furthermore, it is important to appreciate the subtleties that are involved when an entire closed curve consists of horizontal and vertical segments. Examples include a simple rectangle, but also more complicated objects, such as a capital E. When proceeding around such an outline, all of the necessary data has been processed when there are still two segments remaining, because their locations are completely determined at that stage. Thus, this case must be treated separately, as shown in FIG. 5.

As shown in FIG. 5, 2n bits (x, y) are read for an on-curve point p in operation 502. Thereafter, in operation 504, one bit is read. If such bit is "1", p is marked as the beginning of an XY sequence in operation 506. Once this happens, one bit is read in operation 508, and if "1", the first segment is determined to be horizontal in operation 510. On the other hand, if the bit read is "0", the first segment is determined to be vertical in operation 512.

Next, in operation 514, n bits are read for the next coordinate. This is continued, bit-by-bit, in operation 516 until a "1" is encountered in operation 518. Thereafter, if another "1" is read in operation 518, the current contour is closed with two more XY segments in operation 522, and it is determined that the end of the data has been encountered for the current closed curve. Note operation 524.

Another bit is read in operation 526. If a "1" is encountered, the glyph (or character) is determined to be ended in operation 528. On the other hand, if a "0" is encountered, it is determined that there is another closed curve in the glyph in operation 530. Operation then continues in operation 502.

Returning to operation 518, if it is determined that a "0" is read, p is defined as the end of the current XY sequence in operation 532, and the current process is continued in operation 534. In operation 534, information regarding the segment following p is gathered by reading a single bit. If a "0" is encountered, the segment following p is considered a straight line (note operation 541), a majority of the present procedure is skipped, and a bit is read in operation 542.

If, however, a "1" is encountered, another bit is read in operation 536. If, in operation 536, a "1" is encountered, the segment following p is determined to be a quadratic spline in operation 538, and 2n bits are read for a control point in operation 540. Thereafter, a bit is read in operation 542 for reason s that will soon become apparent.

Returning to operation 536, if a "0" is encountered, another bit is read in operation 544. If a "1" is encountered in operation 544, the segment following p is considered a cubic spline in operation 546, and 4n bits are used to determine two control points in operation 548. If a "0" is encountered in operation 544, the segment following p is considered an elliptical arc in operation 550, and $n_a+n_{c1}+n_{c2}+1$ bits are read to define the elliptical arc in operation 552.

In operation 542, a bit is read. If a "1" is encountered, it is determined that the end of the data is encountered for the closed curve in operation 524. On the other hand, then next on-curve point is retrieved in operation 554, and the operation 502 is repeated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for compression of characters, comprising:
   receiving a plurality of characters;
   performing at least one test on the characters to determine if an outline of the characters is capable of being approximated by a mathematical approximation; and
   compressing the characters using the mathematical approximation if the outline of the characters is capable of being approximated;
   wherein the mathematical approximation includes an elliptical arc approximated by position information and rotational information relating to the rotational orientation of the elliptical arc;
   wherein the rotational information includes a plurality of points on the elliptical arc, three or more dimensionless parameters, and a bit of information.

2. The method as recited in claim 1, wherein the three or more dimensionless parameters are determined by defining a center of a circle associated with the elliptical arc, applying a first linear transformation to stretch the circle, and applying a second linear transformation that includes a shear parameter.

3. The method as recited in claim 1, wherein constraints are imposed on the three or more dimensionless parameters to expedite the generation thereof.

4. The method as recited in claim 3, wherein the constraints include a rule that the elliptical arc has a same maximum lateral extent from a line between a pair of on-curve points on the character.

5. A method for compression of characters, comprising:
   receiving a plurality of characters;
   performing at least one test on the characters to determine if an outline of the characters is capable of being approximated by a mathematical approximation; and
   compressing the characters using the mathematical approximation if the outline of the characters is capable of being approximated,
   wherein the mathematical approximation includes a cubic spline approximated by a plurality of control points that are determined by a equation including two variables;
   wherein the control points are determined by the equation including two variables by imposing constraints on slopes associated with lines on which the control points reside.

6. A computer program product for compression of characters, comprising:
   computer code for receiving a plurality of characters;
   computer code for performing at least one test on the characters to determine if an outline of the characters is capable of being approximated by a mathematical approximation; and computer code for compressing the characters using the mathematical approximation if the outline of the characters is capable of being approximated;

wherein the mathematical approximation includes an elliptical arc approximated by position information and rotational information relating to the rotational orientation of the elliptical arc;

wherein the rotational information includes a plurality of points on the elliptical arc, three or more dimensionless parameters, and a bit of information.

7. The computer program product as recited in claim 6, wherein the three or more dimensionless parameters are determined by defining a center of a circle associated with the elliptical arc, applying a first linear transformation to stretch the circle, and applying a second linear transformation that includes a shear parameter.

8. The computer program product as recited in claim 6, wherein constraints are imposed on the three or more dimensionless parameters to expedite the generation thereof.

9. The computer program product as recited in claim 8, wherein the constraints include a rule that the elliptical are has a same maximum lateral extent from a line between a pair of on-curve hits on the character.

* * * * *

UNITED STATES PATENT AND TRADEMARK OFFICE

CERTIFICATE OF CORRECTION

| | |
|---|---|
| PATENT NO. | : 6,614,940 B2 |
| APPLICATION NO. | : 09/802477 |
| DATED | : September 2, 2003 |
| INVENTOR(S) | : Azam et al. |

It is certified that error appears in the above-identified patent and that said Letters Patent is hereby corrected as shown below:

In the claims:
  Col. 10, line 9, please replace "are" with --arc--;
  Col. 10, line 11, please replace "hits" with --points--.

Signed and Sealed this
Thirty-first Day of May, 2011

David J. Kappos
*Director of the United States Patent and Trademark Office*